Sept. 7, 1943.                C. R. BERRY                2,328,774
                               COTTON GIN
                         Filed July 29, 1940        2 Sheets-Sheet 2
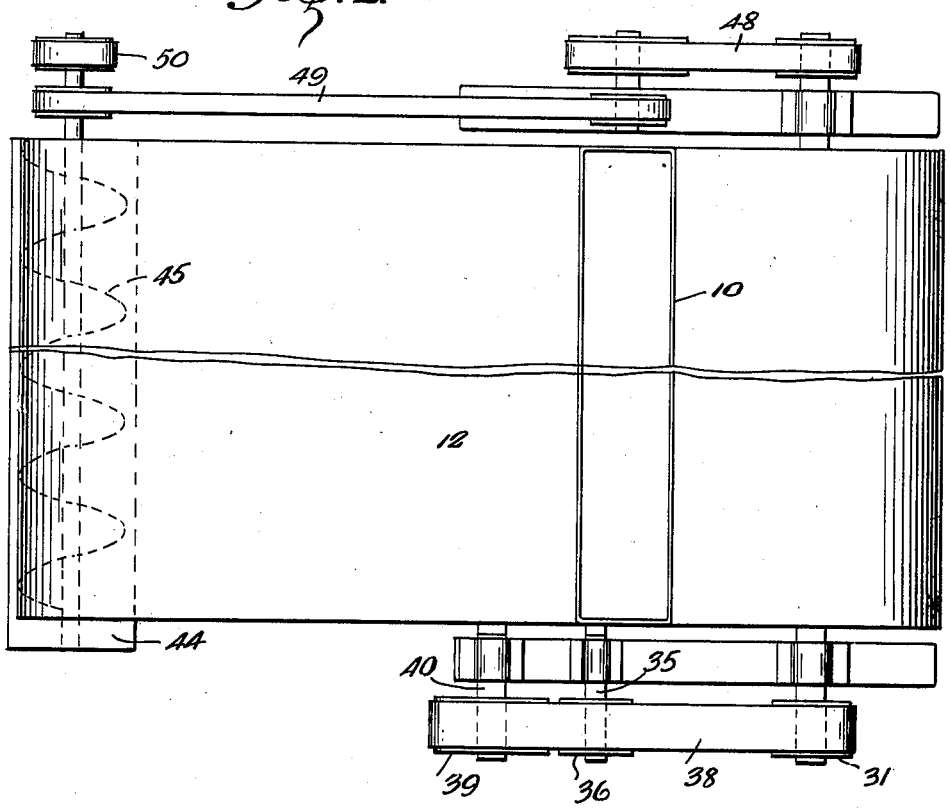
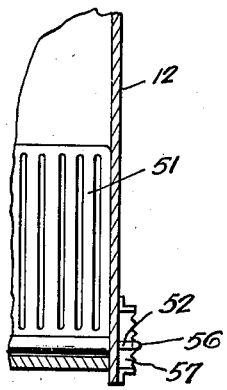
Charles R. Berry
INVENTOR
BY
ATTORNEY Patented Sept. 7, 1943

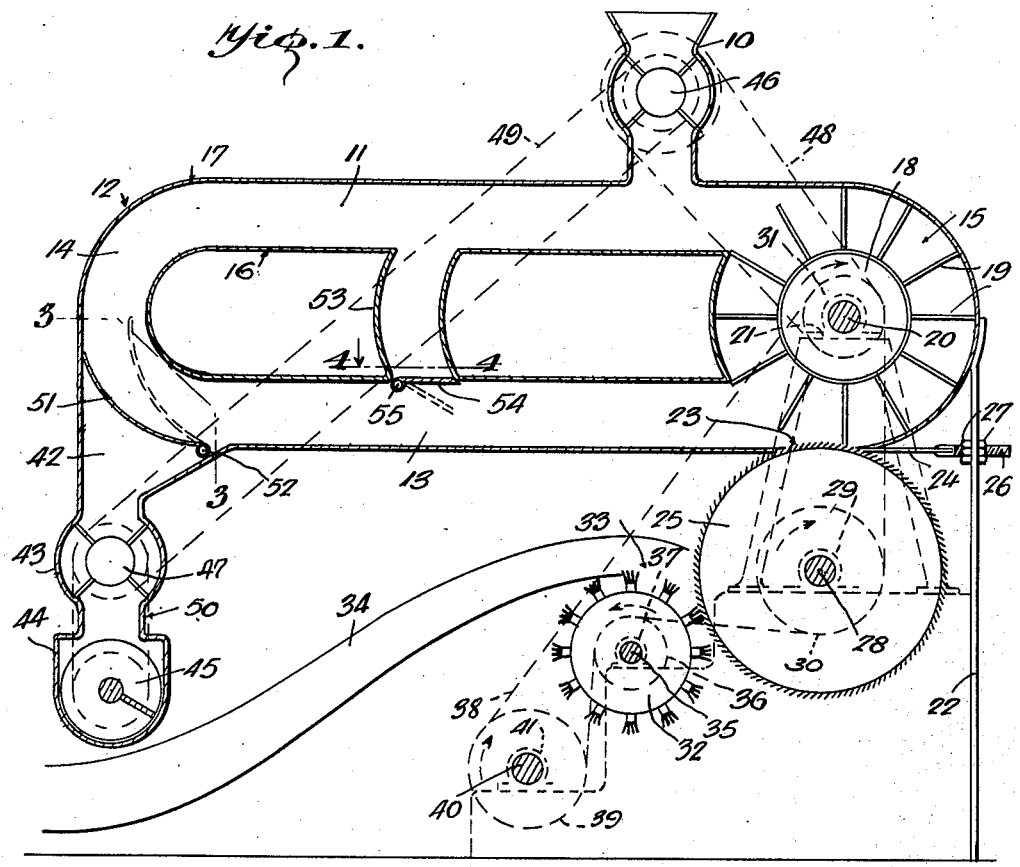
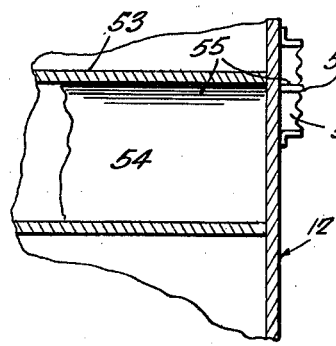

2,328,774

UNITED STATES PATENT OFFICE 2,328,774

COTTON GIN

Charles R. Berry, Greenville, Miss., assignor of one-third to Lyne S. Gamble, Greenville, Miss., and one-third to Rabun Jones, Leland, Miss.

Application July 29, 1940, Serial No. 348,231

3 Claims. (Cl. 19—48)

The present invention relates generally to the ginning of cotton and has for its primary object the provision of a method and apparatus whereby cotton may be ginned more rapidly, effectively and with less trouble than it is possible to do with the methods and gins now commonly in use.

It is a well known fact that in the conventional saw tooth gin, the gin saws extend into a roll box in which the cotton congests, and engage the lower part of the cotton roll in the box, causing the cotton to continually turn in the box so that the contact of the teeth of the saws with the cotton is a more or less haphazard action since the seeds are continually milling around in the box. The operation is slow and, to this extent at least, is far from an efficient action.

It is among the primary objects of the present invention to provide for rapid efficient action more directly on the cotton bolls, rather than a mass of congested cotton, and to bring about elimination of the seeds immediately upon removal of cotton therefrom in a manner substantially more nearly positive, and with less milling around in the cotton, than in the conventional gin and cotton ginning methods now employed.

It is a further object to provide a method of ginning cotton which will be rapid and efficient and which will permit of effective use of a gin cylinder of either the saw or card cloth type and adapt itself to various means for removing the cotton from the gin cylinder.

With these and various other objects in mind, the invention resides in the method and apparatus to be now described in detail in a form which is at present deemed best suited to the use thereof for the practical application of the invention, this description referring to the accompanying drawings which form a part of this specification, and in which, Figure 1 is a vertical sectional view taken transversely through the apparatus of the invention for the efficient carrying out of the method thereof.

Figure 2 is a top plan view thereof, indicating its indeterminate length and the connections whereby its various rotating parts are actuated, and Figures 3 and 4 are fragmentary vertical longitudinal sectional views taken respectively on lines 3—3 and 4—4 of Figure 1.

Referring now to the drawings, the present invention contemplates the elimination of the usual cotton roll box into which the toothed saws of the saw cylinder project, and the direct regulated feed of cotton downwardly through a feed box 10 into the upper channel or passage 11 of an air and cotton circulating casing 12 presenting a lower similar channel or passage 13, a curved connecting channel or passage 14 along one side and a substantially circular chamber 15 connecting the upper and lower passages 11 and 12 along the other side.

The above mentioned channels or passages are formed within the air and cotton circulating casing 12 which, for this purpose, is shown as consisting of an inner shell 16 and an outer shell 17 in such spaced relation that the channels or passages 11, 13 and 14 between the shells are of substantially similar width throughout the entire length of the casing which is, of course, the full length of the feed box 10. Circulation of the cotton is thus provided for transversely within the casing between the inner and outer shells.

To properly form the circular chamber 15 the curved forward side of the outer shell 17 is opposed by the oppositely curved adjacent side of the inner shell 16. Within this chamber is a propelling cylinder 18 having peripherally outstanding and preferably flexible cotton propelling blades 19. This cylinder is mounted on a longitudinal shaft 20, whose ends are journalled in bearings 21, and whose rotation is clockwise as viewed in Figure 1 so that cotton fed in properly regulated quantities through feed box 10 into channel or passage 11, will be drawn into the upper portion of chamber 15 and forcibly discharged from its lower portion into the adjacent forward end of the lower channel or passage 13 and projected along a fixed path wherein it will, by centrifugal action, closely follow the inner surface of the outer shell 17.

Preferably the upper and lower portions of the inner and outer shells 16 and 17 are substantially flat and the two side portions of the outer shell are similarly curved so that the casing as a whole, with or without a front plate or apron 22, will present a symmetrical appearance.

In the lower forward portion of the outer shell 17 is formed a longitudinally slotted throat 23, at one side of which an adjustable throat plate 24 is mounted so as to effectively provide for any slight adjustment necessary to conform to the upper peripheral portion of the ginning cylinder 25 which projects through the throat into the lower channel or passage 13 immediately at the rear of the propeller or cotton projector 18.

The throat plate 24 may be adjusted by means of a threaded forwardly extending stem 26 locked by nuts 27 through the front wall or apron 22.

The ginning cylinder 25 is to be understood as either a saw cylinder or a card cloth cylinder. In the present instance it is shown as a clock-wise rotating card cloth cylinder as viewed in Figure 1 and thus the upper portion, which projects into the channel or passage 13, moves forwardly and oppositely to the rearwardly moving lower portion of the propeller 18. The shaft 28 of this cylinder may be mounted in bearings 29 and have a pulley 30 at one end substantially below a pulley 31 on the shaft 20 of the propeller 18. It will be noted that the relative sizes of the pulleys 30 and 31 provide for relative speedier rotation of the propeller 18 as compared to the ginning cylinder 25.

There is shown a doffer, in the nature of a brush cylinder 32, below and rearwardly of the ginning cylinder 25, for removing cotton therefrom within the suction mouth 33 of a suction lint flue 34. Brush cylinder 32 is shown mounted on a shaft 35 in bearings 37 having a pulley 36 of less diameter than the ginning cylinder pulley 30 and is rotated at greater speed than said cylinder in a counter-clockwise direction as viewed in Figure 1.

For the above purpose a belt 38 may be trained around a lower driving pulley 39 receiving rotation through its shaft 40, in bearings 41, from any suitable source of power. The belt 38 has runs, one of which extends directly to and around the propeller pulley 31 and the other of which is trained upwardly from the driving pulley 39 alternately over brush cylinder pulley 36 and beneath ginning cylinder pulley 30 to thus bring about rotation of these several parts in the desired relative directions, though it is to be understood the invention is not confined to these particular, if preferable, driving connections.

At the rear side of the casing 12 where the lower channel or passage 13 merges into the lower portion of the curved side channel or passage 14, these passages communicate with the upper larger mouth portion of a seed outlet funnel 42. This funnel is in communication at its lower smaller end with a seed discharge box 43 which in turn discharges into a discharge trough 44 having therein a seed discharge conveyor screw 45.

It will be noted at this point that the cotton feed box 10 and the seed discharge box 43 have therein rotating valve members respectively indicated at 46 and 47, the former being driven by a belt 48 from the propeller shaft 20 and the latter by a belt 49 from the former. The conveyor screw 45 may be driven by a belt 50 from the outlet valve 47.

In the upper mouth of the seed discharge funnel is a seed comb 51, preferably curved and adjustably supported at its lower forward edge, as for instance by a rotatably adjustable rod 52, so that its upper rear end may be positioned more or less in the curved rear channel or passage 14 to provide for passage of the seed through the comb as rapidly as they are denuded of cotton.

The valves 46 and 47 substantially close the interior of the casing 12 although the cotton which enters through valve 46 carries some entrained air into the casing, thus making combined air and cotton channels or passages 11, 13 and 14 in which the cotton bolls, by reason of the forceful projection thereof in the lower channel 13 by the propeller 18, move closely along the inner surface of the outer shell 17 in the air stream. The ginning cylinder operates closely adjacent to the point of propulsion of the cotton and thus acts on the cotton at its point of greatest speed and power of movement so that as it strips the cotton from the seed the latter are projected beyond the ginning member and thus present no interference to its continuous action on the cotton. The cotton, as it outlets from the casing through valve 47, carries some entrained air with it, about in the same proportion that air enters with cotton through valve 46, so there is at all times sufficient air in the casing to circuit with the cotton around the propeller 18. In addition it is obvious that air may enter, as well as escape, through the slotted throat 23 adjacent the ginning cylinder 25.

The seeds, if sufficiently denuded of cotton to pass through the comb 51, will fall into the seed outlet funnel 42, and if not they will continue in the circuit to again pass the ginning member. The feed of cotton is of course regulated so as to present in the circulating stream only such an amount of seed cotton as can be effectively handled in the manner described.

After passing the rotary ginning member, the seed cotton will lose some of the momentum initially imparted by the propeller and hence upon impact with the comb 51, such seeds as are ready to pass therethrough, fall out of the air stream in which they otherwise flow around the circuit of passages for repeated action.

In view of the above, it may be desirable to by-pass some of the circulating air to lessen its effect on the cotton flowing around the rear side of the casing and to this end the inner shell 13 may be provided with a curved conduit 53 connecting the lower passage 13 with the upper passage 14 at a suitable point rearwardly of the ginning member and intermediate the front and rear sides of the casing. Thus air may by-pass from the lower to the upper channel apart from the cotton travelling along the inner surface of the outer shell. Within the lower end of this conduit 53 a valve plate 54 will be adjustably mounted at its rear edge, as by means of a rod 55 so that the forward edge of the plate may be adjustably positioned to either close off the by-pass or more or less open the same for the by-passing of air.

As seen in Figure 3, the rod 52 may have an angular end 56 externally of one end of the casing for adjustment in a toothed quadrant 57 for regulating the effective position of the comb 51. Similarly, as seen in Figure 4, the rod 55 may have an angular end 58 externally of the same end of the casing for adjustment in a toothed quadrant 59 to regulate the effective position of the valve plate 54 of the air by-pass.

Obviously many of the structural parts of the gin as thus described and clearly shown, may be modified as well as replaced by other and different parts designed to bring about substantially the same operation and results, and carry out the method of this invention as expressed in the following claims.

Having thus fully described the invention, what is claimed is:

1. In a cotton gin, means forming a closed circuitous path for the travel of seed cotton loosely in an air stream, valved means for feeding seed cotton into said circuit, a valved outlet for seed, means adjacent said outlet to divert seed therefrom the circuit, a rotary toothed member protruding into the circuit for removing lint cotton from the seed, and a blower located at one point in the circuit for causing continuous travel of seed cotton loosely in an air stream; said blower being adjacent to the lint removing means and remote from the seed diverting means.

2. In a cotton gin, means forming a circuitous path for seed cotton and having inner and outer walls, means in said circuit for moving therein air and cotton in a manner to cause the cotton to flow along the outer wall, valved means communicating through the inner wall for by-passing air from one portion of the circuit to another, a rotary toothed lint removing member protruding into the circuit through the outer wall at a point adjacent to said cotton moving means, and means for diverting seed from the circuit at a point remote from said cotton moving means.

3. In a cotton gin, means forming a circuitous path having inner and outer walls, for the passage of seed cotton, valved means for continuously feeding cotton in regulated quantity into said circuit, means for forcibly moving air and cotton in the circuit in a manner to cause the cotton to flow along the outer wall for a substantial portion of its circuit travel, means protruding into the circuit through the outer wall adjacent to said cotton moving means for removing lint, means for diverting seed from the circuit at a point remote from the cotton moving means, and means for by-passing air in the circuit around said seed diverting means.

CHARLES R. BERRY.